UNITED STATES PATENT OFFICE.

WILLIAM A. FAIRBURN, OF MORRISTOWN, NEW JERSEY, ASSIGNOR TO THE DIAMOND MATCH COMPANY, OF CHICAGO, ILLINOIS, A CORPORATION OF ILLINOIS.

COMPOSITION FOR MATCH-HEADS.

15,039. Specification of Reissued Letters Patent. Reissued Feb. 15, 1921.

No Drawing. Original No. 1,360,283, dated November 30, 1920, Serial No. 54,310, filed October 6, 1915. Application for reissue filed January 3, 1921. Serial No. 435,775.

*To all whom it may concern:*

Be it known that I, WILLIAM A. FAIRBURN, a resident of Morristown, in the county of Morris and State of New Jersey, formerly of Short Hills, in the county of Essex and said State, have invented certain new and useful Improvements in Compositions for Match-Heads, of which the following is a specification.

This invention relates to compositions for match heads, and more especially to a composition of matter for the main head or bulb of "double-dipped" matches; that is to say, matches whereof the head comprises a "first dip" or bulb which is ignitible by flame and not by rubbing friction, and a "second dip" or priming tip which is ignitible by rubbing friction.

The object of my invention is the provision of a match composition having quick-drying and high-heating properties, whereby economy in the manufacture of the matches is attained, whereby ready-ignition of the composition by the flame from the priming tip or "second dip" is effected, and whereby quick-transmission of the fire from the composition to the match splint is insured.

Broadly considered my invention comprises a match composition having as an ingredient a mixture of a metal (or an alloy) and a metallic oxid which, when ignited, mutually react and liberate a large amount of heat.

Among the metals that may be used are finely divided aluminum and magnesium; among the alloys that may be used in lieu of a metal are calcium silicon alloy, magnesium aluminum alloy, and calcium aluminum alloy, and among the metallic oxids that may be used are ferroso-ferric oxid; ferric oxid; manganoso-manganic oxid, manganese dioxid; chromic oxid; vanadium pentoxid, and nickelic oxid.

An efficient typical mixture is the product commercially known as "thermit" which comprises finely divided aluminum 60% and magnetic oxid of iron 40%.

Another mixture which may also be advantageously used is the product commercially known as "Jensen mixture," which comprises magnesium 15%, silicon 10% and magnetic oxid of iron 75%.

Another mixture which well fulfils the requirements of my invention comprises calcium silicon alloy 30% and magnetic oxid of iron 70%.

In preparing my improved match composition the amount of the usual oxidizing agent, such, for example, as chlorate of potash, ordinarily employed in match compositions is reduced, and a suitable proportion of a mixture of the character mentioned is added; the whole being intimately mixed with the other components of the composition and made into an aqueous paste of a consistency suitable for match heads.

A specific illustration of the constituent parts, by weight, of a typical composition embodying my invention is as follows:

Thermit 5 parts; potassium chlorate 15 parts; combustible and flaming material 9 parts; filler 18 parts, and binder 8 parts.

The thermit, or equivalent mixture, may be incorporated with an oxidizing agent or agents other than potassium chlorate, such, for example, as barium chlorate or sodium chlorate, or a mixture of chlorates.

It will be noted that the metals mentioned in each of the examples are such as will reduce the oxids mentioned, *i. e.*, aluminum will reduce iron oxids (magnetic oxid). This is due to the fact that the heat of formation of aluminum oxid is greater than the heat of formation of magnetic iron oxid.

A mixture of metallic iron and aluminum oxid would not react to produce heat. The reaction $3Fe_3O_4+8Al=4Al_2O_3+9Fe$ is a strongly exothermic reaction, and is an example of the reactions taking place in the use of my invention. In the mixture of metals (or alloys) and oxids which I use, the metal used in the free state is one which gives an oxid having a higher heat of formation than the oxid employed.

By my improved composition above described match heads are produced which are instantly and smoothly ignited by the flame from the priming tip; they immediately attain an exceedingly high temperature upon ignition, and they quickly and efficiently transmit the fire to the match splint. Moreover such heads when applied to the splints in the process of making the matches dry rapidly; they become very hard and smooth, and they adhere firmly to the splints.

In the appended claims, the term "metal" is intended to cover single metals and also alloys.

I claim—

1. A match head having as an ingredient thereof, a mixture comprising a magnetic iron oxid and a metal whose normal oxid has a heat of formation greater than that of magnetic iron oxid.

2. A match head having as an ingredient thereof, a mixture comprising aluminum and a metal oxid of which the heat of formation is lower than that of aluminum oxid.

3. A match head having as an essential constituent thereof, a mixture comprising aluminum and magnetic iron oxid.

4. A match head composition including a mixture of metallic aluminum, iron oxid, potassium chlorate, combustible and flaming material, a filler and a binder, substantially as described.

Signed at New York, in the county and State of New York, this 13th day of December, A. D. 1920.

WILLIAM A. FAIRBURN.